(12) United States Patent
Savery et al.

(10) Patent No.: US 10,533,394 B2
(45) Date of Patent: Jan. 14, 2020

(54) RADIATION INDUCED THICKENING FOR CEMENT

(71) Applicant: Halliburton Energy Services, Inc., Houston, TX (US)

(72) Inventors: Mark R Savery, Katy, TX (US); Samuel J Lewis, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/740,548

(22) PCT Filed: Aug. 4, 2015

(86) PCT No.: PCT/US2015/043543
§ 371 (c)(1),
(2) Date: Dec. 28, 2017

(87) PCT Pub. No.: WO2017/023297
PCT Pub. Date: Feb. 9, 2017

(65) Prior Publication Data
US 2018/0187512 A1    Jul. 5, 2018

(51) Int. Cl.
*E21B 33/16* (2006.01)
*C09K 8/467* (2006.01)
*C04B 28/02* (2006.01)
*C04B 40/02* (2006.01)
*C04B 103/00* (2006.01)

(52) U.S. Cl.
CPC .............. *E21B 33/16* (2013.01); *C09K 8/467* (2013.01); *C04B 28/02* (2013.01); *C04B 40/0204* (2013.01); *C04B 2103/0067* (2013.01)

(58) Field of Classification Search
CPC ................................ E21B 33/16; C09K 8/467
USPC ........................................................ 166/293
See application file for complete search history.

(56) References Cited

U.S. PATENT DOCUMENTS

| | | |
|---|---|---|
| 6,554,068 B1 | 4/2003 | Chatterji et al. |
| 7,634,059 B2 | 12/2009 | Wraight |
| 8,684,082 B2 | 4/2014 | Lewis et al. |
| 8,770,291 B2 | 7/2014 | Shirshova et al. |
| 2001/0018470 A1 | 8/2001 | Chatterji et al. |
| 2003/0029611 A1 | 2/2003 | Owens |
| 2010/0186955 A1* | 7/2010 | Saasen ................ C04B 28/02 166/288 |
| 2014/0209298 A1* | 7/2014 | Baldasaro ............ E21B 33/13 166/247 |

FOREIGN PATENT DOCUMENTS

WO     2012117228 A2    9/2012

\* cited by examiner

*Primary Examiner* — William D Hutton, Jr.
*Assistant Examiner* — Ashish K Varma
(74) *Attorney, Agent, or Firm* — McAfee & Taft

(57) ABSTRACT

Systems and methods that utilize radiation to set cementitious compositions can be used to set a pipe or casing in a wellbore. The systems and methods involve connecting a radiation tool to the top plug of a two-plug system used to place the cementitious composition in the annulus between the pipe and the wellbore. The systems and methods provide for radiating the cementitious composition as it is introduced into the wellbore and as the radiation tool is retrieved from the pipe.

17 Claims, 6 Drawing Sheets

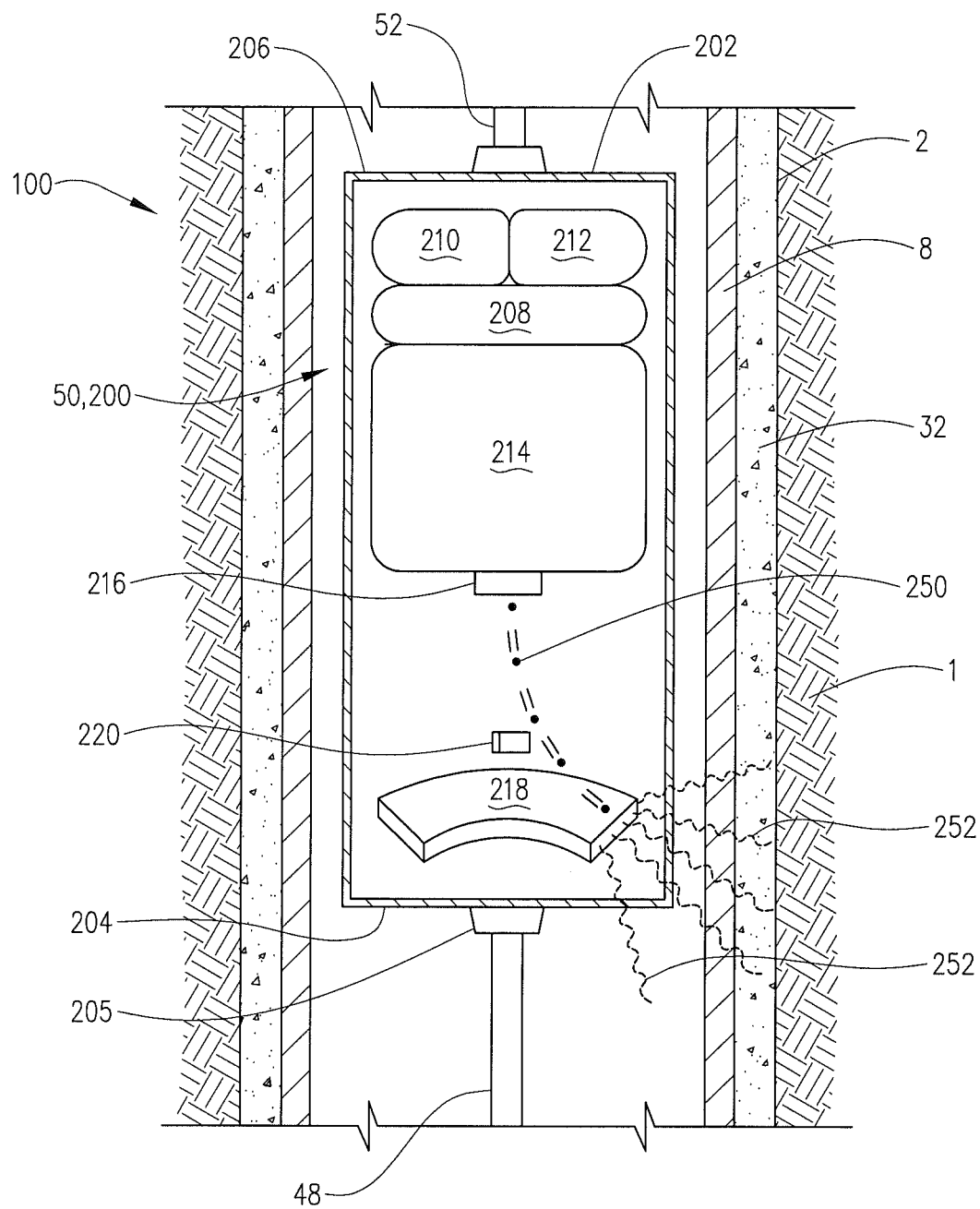

RADIATION INDUCED THICKENING FOR CEMENT

FIELD

The present invention generally relates to cement compositions and more particularly to methods and apparatuses that allow for greater control over the setting of fluids or slurries used in hydrocarbon exploration and production operations, such as subterranean cementing operations.

BACKGROUND

Natural resources such as oil and gas located in a subterranean formation can be recovered by drilling a wellbore down to the subterranean formation, typically while circulating a drilling fluid in the wellbore. After the wellbore is drilled, a string of pipe (e.g., casing) can be run in the wellbore. The drilling fluid is then usually circulated downwardly through the interior of the pipe and upwardly through the annulus between the exterior of the pipe and the walls of the wellbore, although other methodologies are known in the art.

Hydraulic cement compositions are commonly employed in the drilling, completion and repair of oil and gas wells. For example, hydraulic cement compositions are utilized in primary cementing operations whereby strings of pipe such as casing or liners are cemented into wellbores. In performing primary cementing, a hydraulic cement composition is pumped into the annular space between the walls of a wellbore and the exterior surfaces of a pipe string disposed therein to harden. After the cement is placed within the wellbore, a period of time is needed for the cement to cure and obtain enough mechanical strength for drilling operations to resume. This downtime is often referred to as "wait-on-cement", or "WOC". The WOC time ranges from a few hours to several days, depending on the difficulty and criticality of the cement job in question. It is desirable to reduce the WOC time, so that the crew can recommence the drilling operation, and thus reduce the total time and cost of operations. If operations are resumed prior to the cement obtaining sufficient mechanical strength, the structural integrity of the cement can be compromised. As such, systems generally are over-engineered to have very long setting (or thickening) times in order to ensure that the mix remains fluid until all of the cementitious material is in place, which can result in excessive WOC.

BRIEF DESCRIPTION OF THE DRAWINGS

FIG. 6 is a schematic cross-sectional illustration of a system for producing radiation downhole in accordance with at least some embodiments described herein.

DETAILED DESCRIPTION

Figure 1:
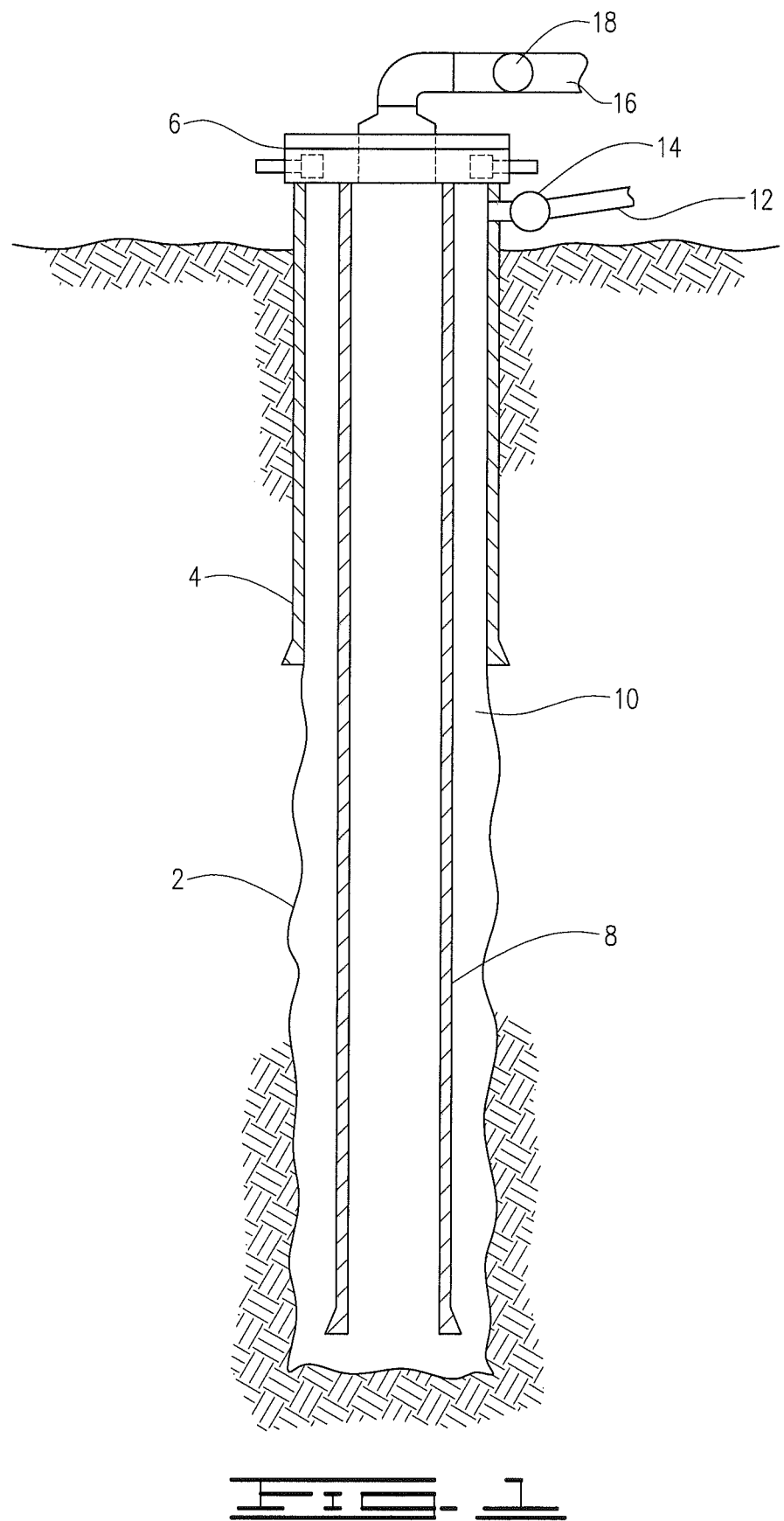
FIG. 1 illustrates a schematic cross-sectional side view of a wellbore.

The embodiments described herein relate to systems and methods that utilize radiation to facilitate the setting of a cementitious composition. As used herein, the term "set" refers to an increase in mechanical strength of a cementitious composition (e.g., in a fluid or slurry form) sufficient to perform a desired result, such as to restrict movement of an item or impede fluid flow or pressure transfer through a fluid. In most instances, the cementitious composition may be referred to as set when it has cured to a fully solid composition. In some instances, the cementitious composition or cement may be referred to as set when it can restrict the movement of a pipe, or impede fluid flow or pressure transfer, regardless of whether the cement has cured to a fully solid composition. In some instances, a fluid or slurry can be referred to as set when it has thickened to a sufficient level that it achieves the desired result, such as the isolation of a particular zone or the restriction of fluid flow or pressure transfer, regardless of whether it has reached its final consistency.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments described herein. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges, some lower limits listed may be greater than some upper limits listed. One skilled in the art will recognize that the selected subset will require the selection of an upper limit in excess of the selected lower limit.

Referring now to the drawings, wherein like reference numbers are used herein to designate like elements throughout the various views, various embodiments are illustrated and described. The figures are not necessarily drawn to scale, and in some instances the drawings have been exaggerated and/or simplified in places for illustrative purposes only. In the following description, the terms "upper," "upward," "lower," "below," "downhole" and the like, as used herein, shall mean: in relation to the bottom or furthest extent of the surrounding wellbore even though the well or portions of it may be deviated or horizontal. The terms "inwardly" and "outwardly" are directions toward and away from, respectively, the geometric center of a referenced object. Where components of relatively well-known designs are employed, their structure and operation will not be described in detail. One of ordinary skill in the art will appreciate the many possible applications and variations of the present invention based on the following description.

FIG. 1 provides a cross-sectional illustration of a system suitable for performing a cementing operation downhole. A surface pipe or surface casing 4, having a wellhead 6 attached, is installed in a wellbore 2. A pipe or casing 8 is suspended from the wellhead 6, extends down the wellbore 2, and terminates with an open end (or alternatively includes circulation ports in the walls of casing 8 (not shown)). An annulus 10 is defined between casing 8 and the wellbore 2. An annulus flow line 12 fluidly communicates with annulus 10 through the wellhead 6 and/or surface casing 4 and includes an annulus valve 14. A flow line 16 fluidly communicates with the inner diameter of casing 8 through the wellhead 6 and includes a casing valve 18.

In broad terms, embodiments of the current method involve pumping a cementitious composition through the casing 8 and circulated up the annulus 10 while fluid returns are taken from the annulus 10 out the annulus flow line 12. Once in place in annulus 10, the cementitious composition is set using radiation. The method is more specifically described with reference to FIGS. 2-5.

Figure 2:
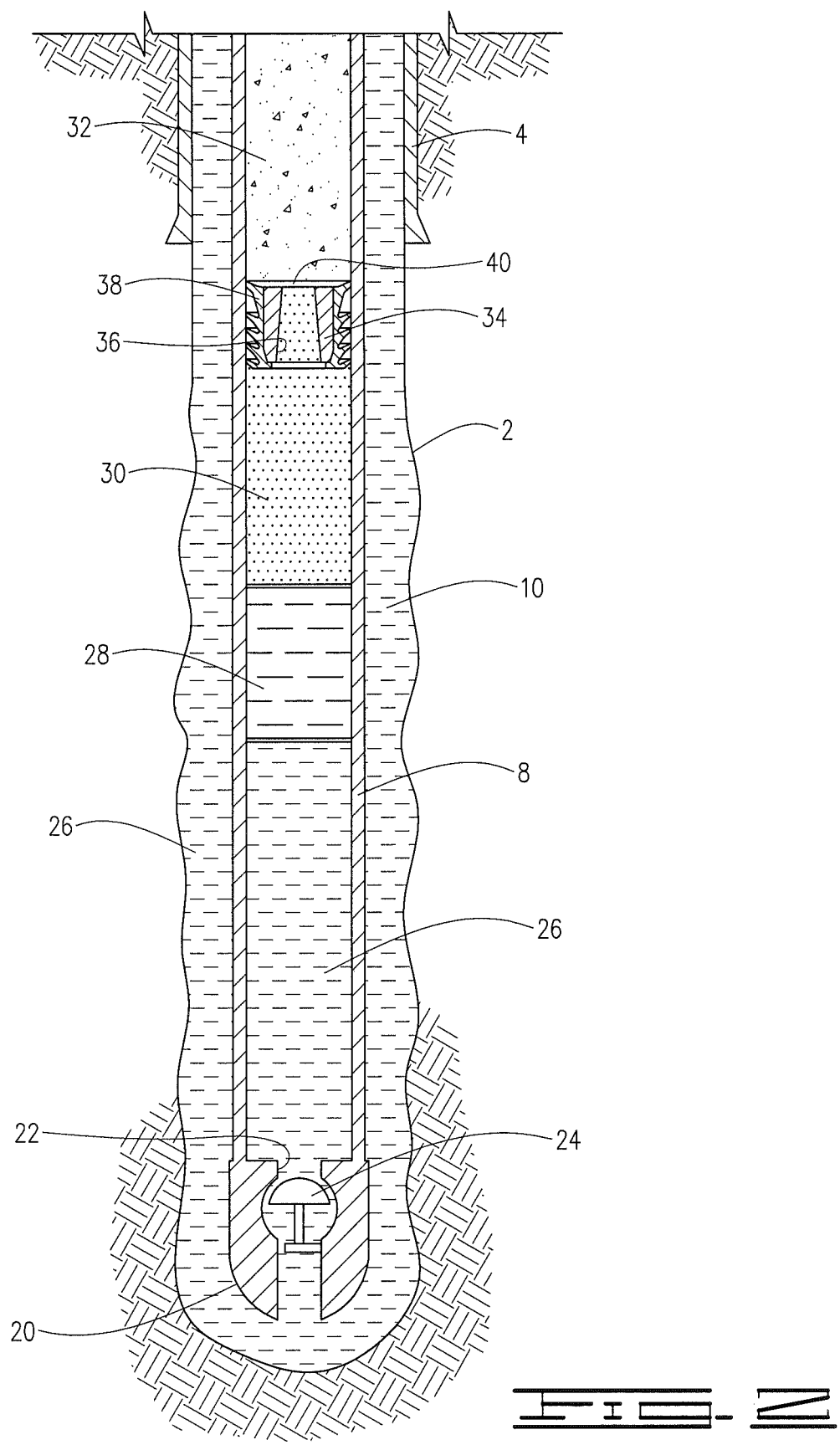
FIG. 2 is a schematic cross-sectional illustration of a wellbore where a bottom plug is illustrated displacing well fluids as a cementitious composition is introduced above the bottom plug.

FIG. 2 is similar to FIG. 1. Pipe 8 is suspended in wellbore 2 in a coaxial relationship, with the outer wall of pipe 8 extending in a spaced relation to the wall of wellbore 2 to form annulus 10. Pipe 8 can be suspended from the wellhead 6 or can be suspended or hung from an existing casing. Thus, pipe 8 can be hung from casing 4. Additionally, pipe 8 can be hung from an existing casing 4, which is itself hung from a prior existing casing.

A float shoe 20 is located at the lower end of pipe 8 and is attached thereto in any known manner. Float shoe 20 is conventional and includes an upwardly facing seating surface 22 and a check valve 24 for preventing the back flow of liquids from the wellbore 2 into the interior of pipe 8.

A drilling fluid 26 is in pipe 8 and within annulus 10. Above drilling fluid 26 is a chemical wash 28. Above chemical wash 28 is spacer fluid 30. Above spacer fluid 30 is cementitious composition 32. A bottom plug 34 separates spacer fluid 30 from cementitious composition 32. Bottom plug 34 is a displacement plug, also known as a separating plug or a wiper plug. In two-plug cement placement, bottom plug 34 is used in conjunction with a top plug 42 (shown in FIG. 3), discussed below. In some embodiments, bottom plug 34 is not utilized; rather, cementitious composition 32 is separated from drilling fluid 26 only by the spacer fluid 30 and chemical wash 28. Where the drilling fluid and cementitious composition 32 are compatible, the cementitious composition 32 may even be directly above the drilling fluid without chemical or mechanical separation. While the description below discusses use of both chemical separations (spacer fluid 30 and chemical wash 28) and mechanical separation (bottom plug 34), it should be understood that the methods and systems disclosed are applicable to applications where one or more of these separations are not present. One skilled in the art will readily see how to apply the methods and systems herein to such applications based on the description provided.

Returning now to FIG. 2, bottom plug 34 typically includes a substantially cylindrical body having a longitudinal bore 36. The body can have cup portions 38 extending upwardly and radially outwardly at an acute angle with respect to a longitudinal axis of bottom plug 34, which generally is parallel with the longitudinal axis of the wellbore 2. The cup portions 38 are sized so that, when bottom plug 34 is inserted in the pipe 8 as shown in FIG. 2, their outer conical surfaces are deflected into substantial wiping engagement with the inner surface of pipe 8. Bottom plug 34 also generally has a membrane 40, which prevents fluid flow through bore 36 but can be ruptured to allow fluid flow through bore 36.

Figure 3:
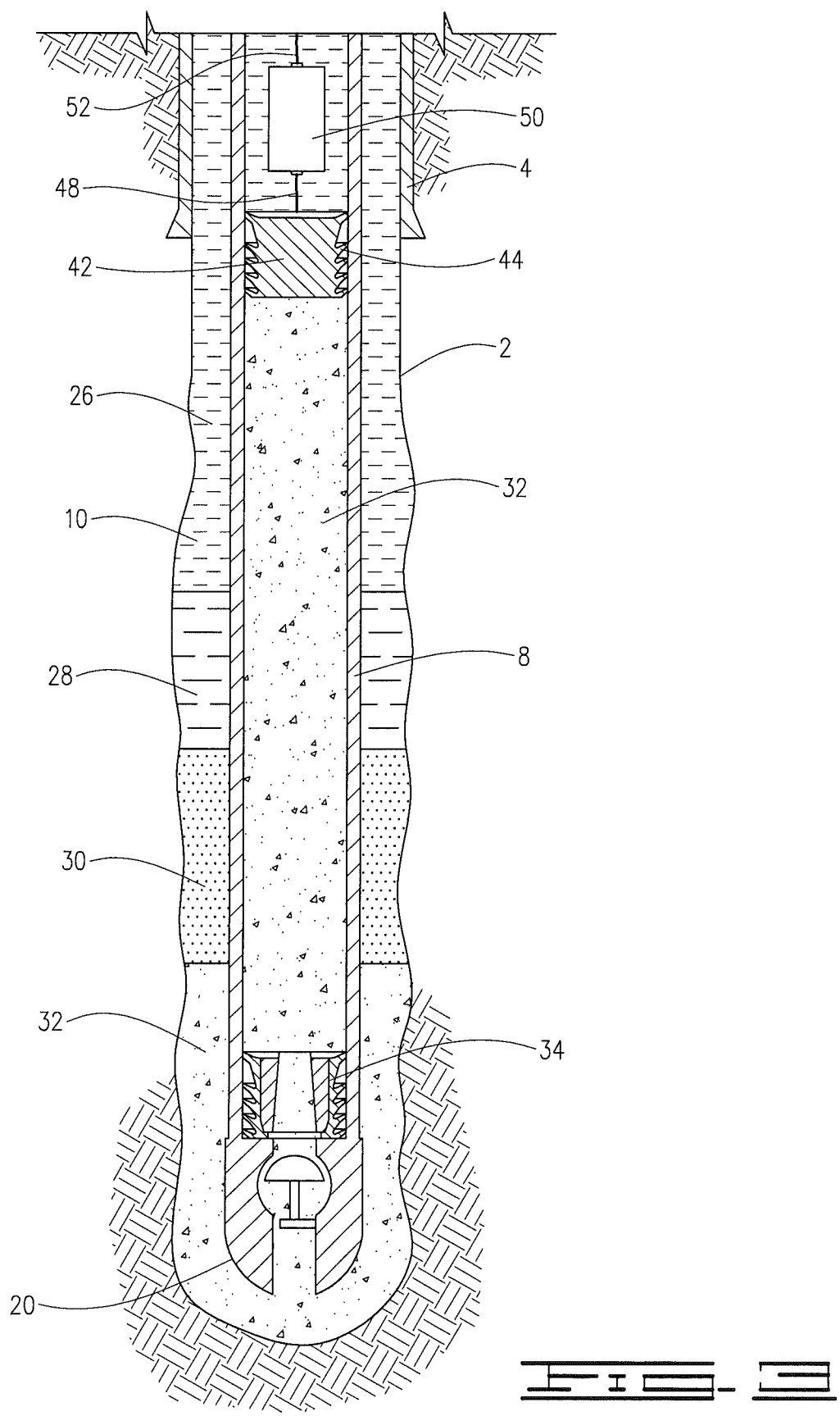
FIG. 3 is a schematic cross-sectional illustration of the wellbore of FIG. 2 where a radiation tool is shown connected to a top plug, which has been introduced above the cementitious composition.

Turning now to FIG. 3, the wellbore 2 is illustrated with bottom plug 34 having moved to meet shoe 20. At this time, membrane 40 is ruptured to create a pathway through which cementitious composition 32 can enter the annulus 10. Drilling fluid 26, chemical wash 28 and spacer fluid 30 have been displaced from pipe 8 and are pushed up the annulus by cementitious composition 32. A top plug 42 is located above cementitious composition 32 and separates cementitious composition 32 from a displacement fluid 46. As will be appreciated, top plug 42 is moved downhole by pressure asserted by displacement fluid 46. In turn, top plug 42 asserts pressure on cementitious composition 32, which asserts pressure on bottom plug 34 resulting in movement of bottom plug 34 until it meets shoe 20 when the pressure ruptures membrane 40.

Top plug 42 is a displacement plug, also known as a separating plug or a wiper plug. Typically, top plug 42 is similar to bottom plug 34 but is not designed to allow any fluid flow. Accordingly, top plug 42 typically includes a substantially cylindrical body, which is solid; thus, upper plug 42 does not have a longitudinal bore. The body can have cup portions 44 extending upwardly and radially outwardly at an acute angle with respect to a longitudinal axis of top plug 42. The cup portions 44 are sized so that, when top plug 42 is inserted in the pipe 8 as shown in FIG. 3, their outer conical surfaces are deflected into substantial wiping engagement with the inner surface of pipe 8.

Above top plug 42 is radiation tool 50, which is connected to top plug 42 by tether 48. Additionally, radiation tool 50 is connected to wireline 52, which can provide power and operational control of radiation tool 50, and additionally, can allow retrieval of radiation tool 50.

Figure 4:
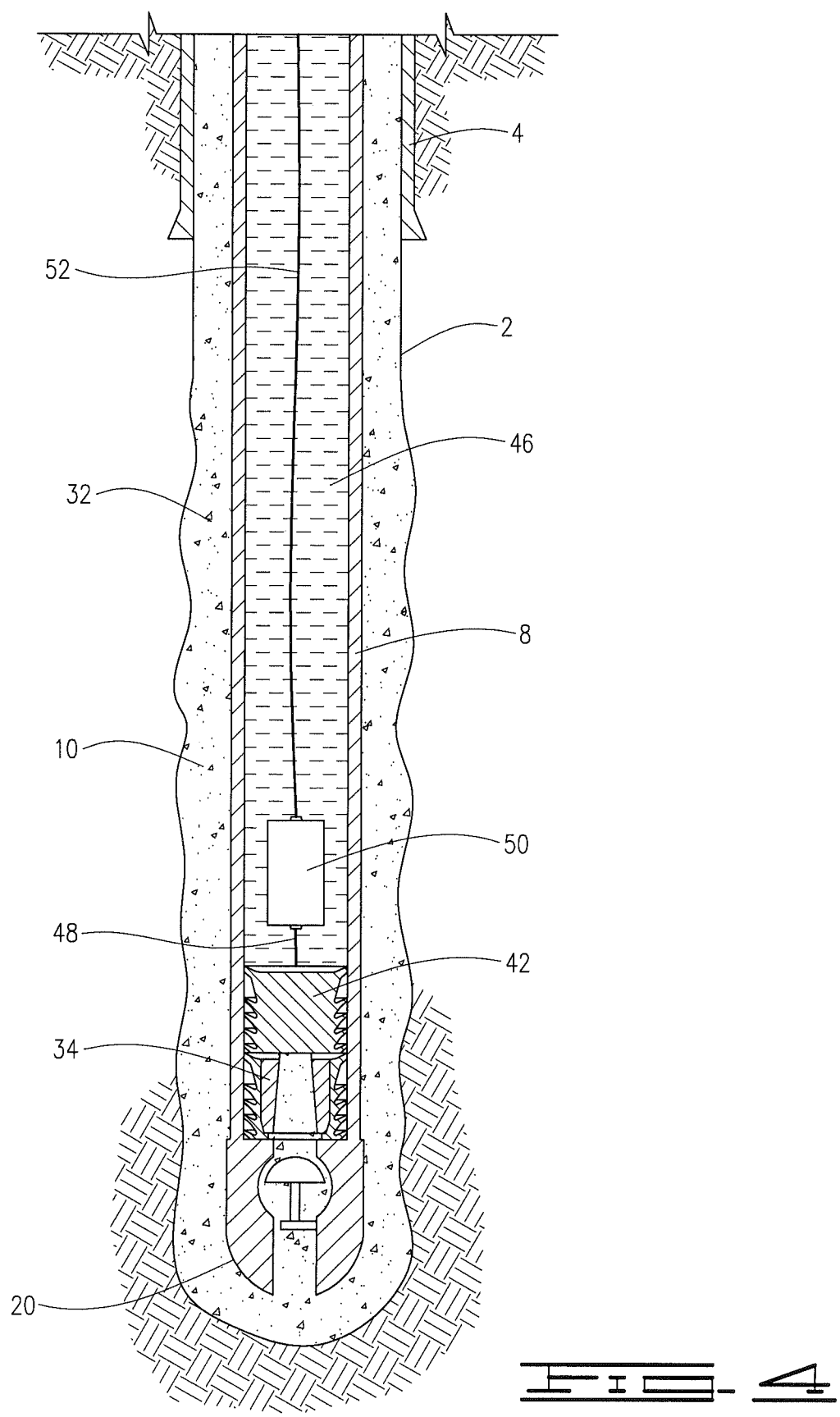
FIG. 4 is a schematic cross-sectional illustration of the wellbore of FIG. 2 where the top plug has displaced the cementitious composition.
Figure 5:
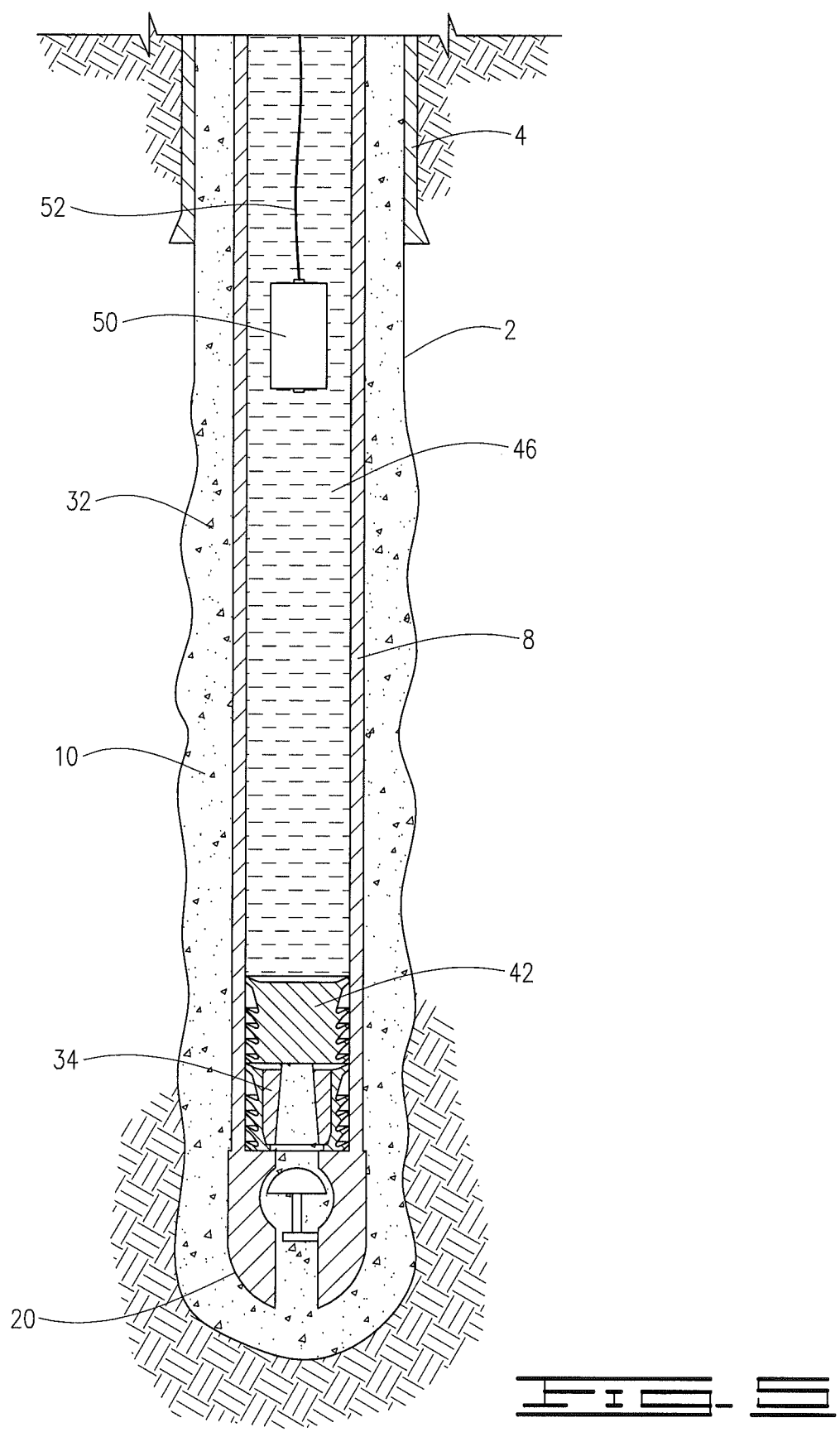
FIG. 5 is a schematic cross-sectional illustration of the wellbore of FIG. 2 where the radiation tool has been released from the top plug and is being retrieved uphole.

FIG. 4 illustrates the top plug 42 having been moved down wellbore 2 to meet bottom plug 34 thus displacing the cementitious composition 32 in pipe 8 with displacement fluid 46. Top plug 42 tows radiation tool 50 down pipe 8 so radiation tool 50 has now moved towards shoe 20. Subsequently, radiation tool 50 is released from top plug 42 and moved uphole towards the surface, as illustrated in FIG. 5. Radiation tool 50 is moved uphole by wireline 52. Radiation tool 50 can be energized to emit radiation which instigates the setting of cementitious composition 32. Radiation tool 50 can be energized during the displacement of cementitious composition 32 hence minimizing the amount of time needed to irradiate cementitious composition 32. The cementitious composition 32 can be irradiated as radiation tool 50 moves down pipe 8, while the tool is moving up pipe 8 for retrieval, or both, depending. By allowing radiation tool 50 to be deployed as part of the displacement operation, the time associated with placing and setting the cementitious composition 32 is significantly reduced.

The operation of the components described above with reference to FIGS. 2-5 will now be described further. After a well interval has been drilled to the desired depth, the drill pipe is removed and casing string or pipe 8 is lowered to the bottom of wellbore 2. The bottom of pipe 8 is usually fitted with a float shoe 20 and centralizers (not shown) can be used to keep the casing centered in the wellbore 2. The pipe interior is typically filled with drilling fluid 26 as it is lowered to the bottom of wellbore 2. Generally, drilling fluids and cement slurries are chemically incompatible and commingling them may result in a thickened or gelled mass at the interface, which can be difficult to remove from the wellbore 2 and can prevent placement of a uniform cement sheath throughout annulus 10. Accordingly, chemical wash 28 and spacer fluid 30 are introduced into the interior of pipe 8 ahead of cementitious composition 32, as illustrated in FIG. 2. These fluids not only provide for separation of cementitious composition 32 from drilling fluid 26 but also clean the pipe 8 and formation surfaces to aid in achieving good chemical bonding.

Next, bottom plug 34 is introduced into pipe 8. Bottom plug 34 provides a physical separation of the cement slurry from the drilling fluid 26. Additionally, cup portions 44 wipe along the interior of pipe 8 further cleaning the interior of the pipe by removing mud and other debris. Above bottom plug 34, a volume of cementitious composition 32 is introduced, which is sufficient to fill annulus 10. Continued pumping of cementitious composition 32 forces drilling fluid 26 out of the casing interior, up annulus 10 and out of wellbore 2, as shown in FIG. 3. Similarly, chemical wash 28 and spacer fluid 30 are forced out of the pipe interior, up annulus 10 and out of wellbore 2.

When bottom plug 34 lands at the bottom of pipe 8, membrane 40 ruptures, opening a pathway for the cement slurry to enter annulus 10. As illustrated, membrane 40 ruptures when bottom plug 34 meets float shoe 20. Generally, as a plug sweeps through pipe 8, a small amount of mud and other debris is pushed ahead of the plug. When top plug 42 moves through pipe 8 as described below, this mud and debris contaminates the cementitious composition 32 just ahead of the top plug 42. The contaminated cement in this area may not set or may set very slowly. Accordingly, often a float collar (not illustrated) is set above float shoe 20 so that bottom plug 34 meets the float collar and membrane 40 ruptures at this position. The use of the float collar can keep contaminated cement inside pipe 8 and not at the float shoe 20 so as to prevent the contaminated cement from entering annulus 10.

Top plug 42 is inserted after the cementitious composition 32. Top plug 42 is followed by displacement fluid 46. Pumping displacement fluid 46 forces top plug 42 downward until it lands on bottom plug 34. Top plug 42 does not have a membrane; therefore, when it lands on top of bottom plug 34, hydraulic communication is severed between the interior of pipe 8 and annulus 10. Thus, the pipe interior and annulus 10 are isolated and annulus 10 is filled with cementitious composition, as shown in FIG. 4.

Radiation tool 50 is attached by a tether 48 to top plug 42; thus, radiation tool 50 is pulled downward by top plug 42. Radiation tool 50 is also attached to wireline 52. Once top plug 42 has landed on bottom plug 34, a signal can be sent through wireline 52 to detach radiation tool 50 from tether 48, as shown in FIG. 5. Wireline 52 then pulls radiation tool 50 to the surface. Radiation tool 50 can be energized by a signal through wireline 52. Thus, radiation tool 50 can be triggered to begin emitting radiation as it travels downward through pipe 8 and can continue emitting radiation once it starts ascending back to the surface so that the radiation tool 50 is continuously emitting radiation during the time it is descending and ascending within pipe 8. Alternatively, radiation tool 50 can be triggered to emit radiation once top plug 42 has landed on bottom plug 34 and continue emitting radiation on the ascent back to the surface. The radiation from radiation tool 50 starts the setting cementitious composition 32 in annulus 10. In this way, the setting of cementitious composition 32 can be started during filling of annulus 10 or immediately after annulus 10 is filled with cementitious composition 32; thus, eliminating delays associated with introduction of the radiation tool 50 into the wellbore 2 after placement of cementitious composition 32.

Suitable radiation tools 50 and cementitious compositions 32 are known in the art; see for example US Patent Publication Number 2014/0209298 and U.S. Pat. Nos. 8,684,082 and 8,770,291. For example, some embodiments described herein may involve irradiating a settable composition with bremsstrahlung photons 252 produced downhole (e.g., with radiation tool 50 being an electron accelerator tool 200 described herein) to facilitate setting of the settable composition. Bremsstrahlung-induced curing is a fast non-thermal process that utilizes highly energetic electrons at controlled doses to produce photons that may be useful in facilitating setting of a settable composition (e.g., for polymerizing and crosslinking polymeric materials).

FIG. 6 provides a cross-sectional illustration of a system 100 for producing bremsstrahlung photons downhole in accordance with at least some embodiments described herein. The system 100 includes radiation tool 50, which in this embodiment is an electron accelerator tool 200. Tool 200 is coupled to a wireline 52 on its uphole end 202 and to tether 48 on its downhole end 204. Attachment to tether 48 can be by detachable connector 205. Electron accelerator tool 200 is disposed in wellbore 2 penetrating a subterranean formation 1. The wireline 52 may provide electrical power transmission and communications between the electron accelerator tool 200 and the surface of the wellbore 2. The wireline 52 may also bear the mass of the electron accelerator tool 200 during transit up and down the wellbore 2.

The electron accelerator tool 200 comprises a housing 206 for containing at least some of the components of the electron accelerator tool 200. The electron accelerator tool 200 may include accelerator electrical power components 208. The electrical power components 208 may include devices for allocating electrical power from the tool wireline 52 to the various power-using components throughout the electron accelerator tool 200.

The electron accelerator tool 200 may also include cooling components 210 (e.g., cryogenic liquid with insulation) and communication components 212. The communication components 212 may include devices for communicating signals between the electron accelerator tool 200 and the surface of the wellbore 2.

Electron acceleration components 214 that provide/produce accelerated electrons 250 (also referred to as high-energy electrons) may also be included in the electron accelerator tool 200. In some embodiments, a linear acceleration system that uses the abundant linear space within a casing to amplify voltage may be used to produce the accelerated electrons 250. This system, which may be engineered to possess a long, narrow shape, makes it amenable to downhole utility. In some embodiments, the accelerator may use radiofrequency ("RF") power to produce the accelerated electrons 250. The accelerator may be linear or a cyclotron accelerator. In some embodiments, some or all of the following components may be operated: a high voltage power supply, a magnetron or klystron, a high voltage switching circuit for pulsing, waveguides for RF transfer, accelerating structures/cavities, an electron gun, electron beam focusing/steering components, an electron beam target, an electron beam dump, radiation shielding, pumps, and plumbing, and the like. In some embodiments, wakefield technology that uses laser pulses to evacuate electrons from small volumes of a solid (e.g., crystals) may be used to produce the accelerated electrons 250.

The devices that comprise the electron acceleration components 214 may vary based on the method of electron acceleration implemented (e.g., linear RF acceleration, cyclotron acceleration, or wakefield acceleration). For example, the electron acceleration components 214 may include lasers, capacitors, diodes, and other devices for producing a plasma, RF induced electromagnetic fields, and the like. In addition, the electron accelerator tool 200, an electron acceleration component 214, or a portion thereof may have a characteristic radius suitable for use in producing an electron beam.

In some embodiments, the accelerated electrons 250 may have an energy ranging from a lower limit of about 0.1 MeV, about 0.5 MeV, about 1 MeV, or about 5 MeV to an upper limit of about 50 MeV, about 40 MeV, about 30 MeV, about 20 MeV, or about 10 MeV, wherein the energy of the electrons may range from any lower limit to any upper limit and encompasses any subset therebetween. In some embodiments, the maximum intensity of the electron used produce bremsstrahlung photons 252 may be over $10^{14}$ electrons per second (e.g., up to about $6.25 \times 10^{16}$ electrons per second).

At least one of the electron acceleration components 214 may include an electron beam port 216 where the accelerated electrons are expelled from the electron acceleration component 215 and put on a trajectory to impinge upon a target 218 that converts the accelerated electrons 250 into bremsstrahlung photons 252. In some embodiments, the target 218 may be a converter material (e.g., a high-Z material having an atomic number of 70 and above) within the housing 206. Examples of converter materials may include, but are not limited to, tungsten, tantalum, rhenium, osmium, platinum, thorium, uranium, neptunium, lead, mercury, thallium, gold, iridium, iron, aluminum, tin, and the like, and any combination thereof, including alloys comprising the foregoing. In some embodiments, the target 218 may have a thickness that ranges from a lower limit of about 1 mm, about 2 mm, about 5 mm, or about 10 mm to an upper limit of about 100 mm, about 50 mm, about 25 mm, about 10 mm, or about 5 mm, wherein the target thickness may range from any lower limit to any upper limit and encompasses any subset therebetween as long as the upper limit exceeds the lower limit.

In some embodiments, it may be desirable to create a trajectory for the accelerated electrons 250 whereby they impinge upon the target 218 at angles that are as perpendicular to the casing 8 as feasible. This trajectory may minimize the path length of the bremsstrahlung photons 252 though the casing 8 and to the cementitious composition 32. As such, the position of the electron beam port 216 and/or the target 218 may, in some embodiments, be positioned at least substantially parallel to the radial plane of the electron accelerator tool 200 and casing 8 (not shown). In some embodiments, the electron accelerator tool 200 may include an electron beam rastoring device 220 (e.g., an electromagnet) to manipulate the trajectory of the accelerated electrons 250 to depart from straight lines. In some embodiments, permanent magnets may be used to manipulate the electron trajectory, either stationary or moved by a small motor. In some embodiments, the electron accelerator tool 200 may forego the use of the rastoring device 220 and instead align the target 218 with the electron beam port 216 or increase the size of the target 218.

As explained above, the electron accelerator tool 200 can be conveyed though the wellbore 2 or portions thereof. This exposes cementitious composition 32 disposed between the casing 8 and the wellbore 2 to bremsstrahlung photons 252.

The rate of setting for the cementitious composition 32 may depend on, inter alia, the dose of bremsstrahlung photons 252 experienced by the settable composition. In some embodiments, cementitious compositions 32 may be subjected to a bremsstrahlung radiation dose ranging from a lower limit of about 1 gray, about 10 grays, or about 100 grays to an upper limit of about 1000 grays, about 750 grays, about 500 grays, or about 250 grays, wherein the radiation dose may range from any lower limit to any upper limit and encompasses any subset therebetween.

The bremsstrahlung radiation dose depends on the duration and intensity of radiation exposure. The intensity of the bremsstrahlung photons depends on, inter alia, the properties of the electron beam used in the production of the bremsstrahlung photons 252. In some embodiments, the electron beam and, consequently, the bremsstrahlung photons 252, may be generated continuously. In some embodiments, the electron beam and the bremsstrahlung photons 252 may be generated in pulses. In either instances, the average current of the electron beam may range from a lower limit of about 10 microamps ("µA"), 50 µA, 100 µA, or 500 µA to an upper limit of about 10 milliamps ("mA"), 5 mA, or 1 mA, wherein the average current of the electron beam may range from any lower limit to any upper limit and encompasses any subset therebetween.

In a pulsed electron beam, the average current depends on the characteristics of the pulses including, but not limited to, the pulse width, the peak current, and the repetition rate (i.e., pulses per second). One skilled in the art will recognize appropriate values for each of these suitable for producing an average current described herein.

The cementitious compositions disclosed herein generally include water and a cement component (e.g., a hydraulic cement that can include calcium, aluminum, silicon, oxygen, and/or sulfur that sets and hardens by reaction with the water). As used herein, the term "cementitious composition" encompasses pastes (or slurries), mortars, grouts (e.g., oil well cementing grouts), shotcrete, and concrete compositions including a hydraulic cement binder. The terms "paste," "mortar," and "concrete" are terms of art: "pastes" are mixtures composed of a hydratable (or hydraulic) cement binder (usually, but not exclusively, Portland cement, Masonry cement, Mortar cement, and/or gypsum, and may also include limestone, hydrated lime, fly ash, granulated blast furnace slag, and silica fume or other materials commonly included in such cements) and water; "mortars" are pastes additionally including fine aggregate (e.g., sand); and "concretes" are mortars additionally including coarse aggregate (e.g., crushed rock or gravel). The cement compositions described herein may be formed by mixing required amounts of certain materials (e.g., a hydraulic cement, water, and fine and/or coarse aggregate) as may be required for making a particular cementitious composition.

Examples of hydraulic cements may include, but are not limited to, Portland cements (e.g., Classes A, C, G, and H Portland cements), pozzolana cements, gypsum cements, phosphate cements, high alumina content cements, silica cements, high alkalinity cements, and combinations thereof. Cements including shale, cement kiln dust, or blast furnace slag also may be suitable for use in the some embodiments described herein. In certain embodiments, the shale may include vitrified shale. In certain other embodiments, the shale may include raw shale (e.g., unfired shale), or a mixture of raw shale and vitrified shale.

The cementitious composition described herein can include a polymerizable additive capable of undergoing polymerization when subjected to radiation. In some embodiments, the polymerizable additive may be present in an amount ranging from a lower limit of about 0.01%, about 0.1%, about 1%, or about 5% by weight of the cement composition to an upper limit of about 25%, about 15%, or about 10% by weight of the cement composition, wherein the amount of polymerizable additive may range from any lower limit to any upper limit and encompasses any subset therebetween.

Examples of polymerizable additive may include, but are not limited to, alkeneoxides, vinyl pyrrolidones, vinyl alcohols, acrylamides, vinyl methyl ethers, isobutylenes, fluoroelastomers, esters, tetrafluoroethylenes, acetals, propylenes, ethylenes, methylpentenes, methylmethacrylates, fluorinated ethylene propylenes, and the like, any derivative thereof, and any combination thereof.

In some embodiments, a cementitious composition described herein may also include a crosslinking agent capable of crosslinking a polymer formed by the polymerization of the polymerizable additive. Examples of crosslinking agent may include, but are not limited to, poly(ethylene glycol)diacrylates, poly(ethylene glycol) dimethacrylates, trimethylolpropane triacrylates (TMPTA), ethoxylated TMPTAs, trimethylolpropane trimethacrylates, trimethylolpropanetriacrylates, hexanediol diacrylates, N,N-methylene bisacrylamides, hexanedioldivinylethers, triethyleneglycol diacrylates, pentaeritritoltriacrylates, tripropyleneglycol diacrylates, 1,3,5-triallyl-1,3,5-triazine-2,4,6 (1H, 3H, 5H)-triones, 2,4,6-triallyloxy-1,3,5-triazines, alkoxylated bisphenol A diacrylates, and the like, any derivative thereof, and any combination thereof.

In some embodiments, a cementitious composition described herein may also include a set retarder that lengthens the setting time of the cementitious composition. In some instances, these set retarders allow a cementitious composition to be pumped along long distances without the effect of premature setting. In some embodiments, the set retarders may be present in an amount ranging from a lower limit of about 0.01%, about 0.1%, or about 1% by weight of the cement composition to an upper limit of about 10%, about 5%, or about 1% by weight of the cement composition, wherein the amount of the set retarders may range from any lower limit to any upper limit and encompasses any subset therebetween.

Examples of set retarders may include, but are not limited to, phosphonic acid, phosphonic acid derivatives, lignosulfonates, salts, sugars, carbohydrate compounds, organic acids, carboxymethylated hydroxyethylated celluloses, synthetic co- or ter-polymers including sulfonate and carboxylic acid groups, borate compounds, and the like, any derivative thereof, and any combination thereof. In some embodiments, the set retarders may include phosphonic acid derivatives, such as those described in U.S. Pat. No. 4,676,832. Examples of suitable borate compounds may include, but are not limited to, sodium tetraborate and potassium pentaborate. Examples of suitable organic acids may include, but are not limited to, gluconic acid and tartaric acid.

In some embodiments, the set retarders may include a sensitizer-containing retarder (e.g., a boron-containing retarder), also referred to as a sensitized retarder. In some embodiments, the sensitizer may comprise a material having a strong radiation absorption property. In some embodiments, the sensitizer may be a scintillator material. In some embodiments, the sensitizer may be any material that increases the capture efficiency of the bremsstrahlung radiation within the cementitious composition. In some embodiments, the sensitizer may be a boron-containing retarder, also referred to as a boronated retarder. Examples of boronated retarders may include boronated versions of the set retarders described above (e.g., a boronated sugar, a boronated carbohydrate, a boronated glucose (e.g., 3-o-(o-carborany-1-ylmethyl)-D-glucose presented in U.S. Pat. No. 5,466,679), and the like).

In some embodiments, a cementitious composition described herein may include a set accelerator. As used herein, the term "set accelerator" can include any component, which reduces the setting time of a settable composition.

In some embodiments, the set accelerators may be present in an amount ranging from a lower limit of about 0.1%, about 1%, or about 5% by weight of the cement composition to an upper limit of about 20%, about 15%, or about 10% by weight of the cement composition, wherein the amount of the set accelerators may range from any lower limit to any upper limit and encompasses any subset therebetween.

Examples of set accelerators may include, but are not limited to, alkali and alkali earth metal salts (e.g., calcium salts like calcium formate, calcium nitrate, calcium nitrite, and calcium chloride), silicate salts, aluminates, amines (e.g., triethanolamine), and the like, any derivative thereof, and any combination thereof.

In some embodiments, a cementitious composition described herein may include oxidizing agents that degrade or otherwise deactivate the set retarder. In some embodiments, the oxidizing agents may be present in an amount ranging from a lower limit of about 0.1%, about 1%, or about 5% by weight of the cement composition to an upper limit of about 20%, about 15%, or about 10% by weight of the cement composition, wherein the amount of the oxidizing agents may range from any lower limit to any upper limit and encompasses any subset therebetween.

Examples of oxidizing agents may include, but are not limited to, alkaline earth and zinc salts of peroxide, perphosphate, perborate, percarbonate; calcium peroxide, calcium perphosphate, calcium perborate, magnesium peroxide, magnesium perphosphate, zinc perphosphate; calcium hypochlorite, magnesium hypochlorite, chloramine T, trichloroisocyanuric acid, trichloromelamine, dichloroisocynaurate dihydrate, anhydrous dichloroisocynaurate; and the like, any derivative thereof, and any combination thereof.

In some embodiments, a settable composition described herein may be a sealant (e.g., a hardenable resin composition that comprises a liquid hardenable resin and a hardening agent).

Selection of a suitable liquid hardenable resin may be affected by the temperature of the subterranean formation to which the composition will be introduced. By way of example, for subterranean formations having a bottom hole static temperature ("BHST") ranging from about 60° F. to about 250° F., two-component epoxy-based resins comprising a hardenable resin component and a hardening agent component in conjunction with specific hardening agents may be preferred. For subterranean formations having a BHST ranging from about 300° F. to about 600° F., a furan-based resin may be preferred. For subterranean formations having a BHST ranging from about 200° F. to about 400° F. either a phenolic-based resin or a one-component high-temperature epoxy-based resin may be suitable. For subterranean formations having a BHST of at least about 175° F., a phenol/phenol formaldehyde/furfuryl alcohol resin may also be suitable.

In some embodiments, the liquid hardenable resins may be included in the hardenable resin compositions described herein in an amount ranging from a lower limit of about 20%, about 30%, about 40%, about 50%, about 60%, about 70%, or about 75% by volume of the hardenable resin composition to an upper limit of about 90%, about 80%, or about 75% by volume of the hardenable resin composition, and wherein the amount may range from any lower limit to any upper limit and encompasses any subset therebetween. It is within the ability of one skilled in the art with the benefit of this disclosure to determine how much of the liquid hardenable resin may be needed to achieve the desired results, which may depend on, inter alia, the composition of liquid hardenable resin, the composition of the hardening agent, and the relative ratios thereof.

As used herein, the term "hardening agent" refers to any substance capable of transforming the liquid hardenable resin into a hardened, consolidated mass. Examples of suitable hardening agents may include, but are not limited to, aliphatic amines, aliphatic tertiary amines, aromatic amines, cycloaliphatic amines, heterocyclic amines, amido amines, polyamides, polyethyl amines, polyether amines, polyoxyalkylene amines, carboxylic acids, carboxylic anhydrides, triethylenetetraamine, ethylene diamine, N-cocoalkyltrimethylene, isophorone diamine, N-aminophenyl piperazine, imidazoline, 1,2-diaminocyclohexane, polyetheramine, polyethyleneimines, diethyltoluenediamine, 4,4'-diaminodiphenyl methane, methyltetrahydrophthalic anhydride, hexahydrophthalic anhydride, maleic anhydride, polyazelaic polyanhydride, phthalic anhydride, and combinations thereof. Examples of commercially available hardening agents may include, but are not limited to, ETHACURE®100 (75%-81% 3,5-diethyltoluene-2,4-diamine, 18%-20% 3,5-diethyltoluene-2,6-diamine, and 0.5%-3% dialkylated m-phenylenediamines, available from Albemarle Corp.) and JEFFAMINE®D-230 (a polyetheramine, available from Huntsman Corp.).

In some embodiments, the hardening agent may comprise a mixture of hardening agents selected to impart particular qualities to the resin-based sealant composition. For example, in particular embodiments, the hardening agent may comprise a fast-setting hardening agent and a slow-setting hardening agent. As used herein, the terms "fast-setting hardening agent" and "slow-setting hardening agent" do not imply any specific rate at which the agents set a hardenable resin; instead, the terms merely indicate the relative rates at which the hardening agents initiate hardening of the resin. Whether a particular hardening agent is considered fast-setting or slow-setting may depend on the other hardening agent(s) with which it is used. In a particular embodiment, ETHACURE®100 may be used as a slow-setting hardening agent in combination with JEFFAMINE®D-230 as a fast-setting hardening agent. In some embodiments, the ratio of fast-setting hardening agent to slow-setting hardening agent may be selected to achieve a desired behavior of liquid hardening agent component. For example, in some embodiments, the fast-setting hardening agent may be at a ratio of approximately 1:5 by volume with the slow-setting hardening agent. With the benefit of this disclosure, one of ordinary skill in the art should be able to select the appropriate ratio of hardening agents for use in a particular application.

In some embodiments, the hardening agent may be included in the hardenable resin compositions in an amount sufficient to at least partially harden the liquid hardenable resin. In some embodiments, the hardening agents may be included in the hardenable resin compositions described herein in an amount ranging from a lower limit of about 1%, about 5%, about 10%, about 25%, or about 50% by volume of the liquid hardening agent to an upper limit of about 100%, about 75%, or about 50% by volume of the liquid hardening agent, and wherein the amount may range from any lower limit to any upper limit and encompasses any subset therebetween.

In some embodiments, the hardenable resin compositions may further comprise at least one of a solvent (e.g., an aqueous diluent or carrier fluid), a silane coupling agent, an accelerator, and any combination thereof.

In some embodiments, a solvent may be added to the hardenable resin compositions to reduce its viscosity for ease of handling, mixing and transferring. However, in particular embodiments, it may be desirable not to use such a solvent for environmental or safety reasons. It is within the ability of one skilled in the art with the benefit of this disclosure to determine if and how much solvent may be needed to achieve a viscosity suitable to the subterranean conditions of a particular application. Factors that may affect this decision include geographic location of the well, the surrounding weather conditions, and the desired long-term stability of the resin-based seal resulting from setting of the hardenable resin compositions.

Generally, any solvent that is compatible with the liquid hardenable resin and that achieves the desired viscosity effect (e.g., degree of hardening) may be suitable for use in the hardenable resin composition. Suitable solvents may include, but are not limited to, polyethylene glycol, butyl lactate, dipropylene glycol methyl ether, dipropylene glycol dimethyl ether, dimethyl formamide, diethylene glycol methyl ether, ethyleneglycol butyl ether, diethyleneglycol butyl ether, propylene carbonate, d-limonene, fatty acid methyl esters, reactive diluents, and combinations thereof. Selection of an appropriate solvent may be dependent on the compositions of the liquid hardenable resin, the concentration of the liquid hardenable resin, and the composition of the hardening agent. With the benefit of this disclosure, the selection of an appropriate solvent should be within the ability of one skilled in the art. In some embodiments, the solvent may be included in the hardenable resin compositions in an amount ranging from a lower limit of about 0.1%, about 1%, or about 5% by weight of the liquid hardenable resin to an upper limit of about 50%, about 40%, about 30%, about 20%, or about 10% by weight of the liquid hardenable resin, and wherein the amount may range from any lower limit to any upper limit and encompasses any subset therebetween. Optionally, the liquid hardenable resin component may be heated to reduce its viscosity, in place of, or in addition to using a solvent.

In some embodiments, the hardenable resin compositions described herein may comprise an accelerator, which accelerates (e.g., via catalysis) the onset and duration of hardening of the hardenable resin compositions to the resin-based sealant composition. Suitable accelerators may include, but are not limited to, organic or inorganic acids like maleic acid, fumaric acid, sodium bisulfate, hydrochloric acid, hydrofluoric acid, acetic acid, formic acid, phosphoric acid, sulfonic acid, alkyl benzene sulfonic acids such as toluene sulfonic acid and dodecyl benzene sulfonic acid ("DDBSA"), phenols, tertiary amines (e.g., 2,4,6-tris(dimethylaminomethyl)phenol, benzyl dimethylamine, and 1,4-diazabicyclo[2.2.2]octane), imidazole and its derivatives (e.g., 2-ethyl,-4-methylimidazole, 2-methylimidazole, and 1-(2-cyanoethyl)-2-ethyl-4-methylimidazole), Lewis acid catalysts (e.g., aluminum chloride, boron trifluoride, boron trifluoride ether complexes, boron trifluoride alcohol complexes, and boron trifluoride amine complexes), and the like, and any combination thereof.

Some embodiments may involve introducing a cementitious composition into a pipe or casing disposed in a wellbore. The cementitious composition is introduced above a first fluid, disposed in the pipe. Typically, the first fluid is two or more fluids disposed one above another, such as a spacer fluid disposed above a chemical wash, which is in turn disposed above a drilling fluid. The cementitious composition displaces the first fluid from the pipe and into the annulus. The cementitious composition sets when subjected to radiation. Next, a top plug and a radiation tool are introduced into the pipe above the cementitious composition, wherein the radiation tool is connected to the top plug by a tether such that movement of the second top plug results in movement of the radiation tool. Subsequently, a second fluid is introduced above the top plug so that the top plug is moved downward. The downward movement of the top plug displaces the cementitious composition from the pipe and into the annulus. Radiation is produced from the radiation tool; and the cementitious composition is irradiated in the annulus by the radiation so that the cementitious composition sets and bonds the pipe to the wellbore.

Other embodiments may involve introducing a bottom plug into a pipe or casing disposed in a wellbore. The bottom plug is introduced above a first fluid. Generally, the first fluid generally comprises a drilling fluid and can be two or more fluids disposed one above another, such as a spacer fluid disposed above a chemical wash, which is in turn disposed above a drilling fluid. Next, a cementitious composition is introduced into the pipe above the bottom plug so that the cementitious composition forces the bottom plug downwardly in the pipe and displaces the first fluid from the pipe and into the annulus. The cementitious composition sets when subjected to radiation.

After introduction of the cementitious composition, a top plug and a radiation tool are introduced into the pipe above the cementitious composition, wherein the radiation tool is connected to the top plug by a tether such that movement of the top plug results in movement of the radiation tool. Subsequently, a second fluid or displacement fluid is introduced above the top plug so that the top plug is move downward. The bottom plug opens to allow passage of the cementitious composition. The downward movement of the top plug displaces the cementitious composition from the pipe and into the annulus. The radiation tool produces radiation so that the cementitious composition is irradiated in the annulus by the radiation so that the cementitious composition sets and bonds the pipe to the wellbore.

After displacement of the cementitious composition from the pipe, the above methods can further comprise releasing the radiation tool from the top plug and moving the radiation tool up the wellbore to the surface. Also, the methods can comprise sending a first signal to the radiation tool through a wireline such that the radiation tool produces radiation and sending a second signal through the wireline to detach the radiation tool from the tether thus disconnecting the radiation tool from the second plug.

The ionizing radiation can be produced from the radiation tool during displacement of the cementitious composition by the top plug, thus irradiating a first portion of the cementitious composition in the annulus during displacement of a second portion of the cementitious composition from the pipe. The radiation can then be stopped during movement of the radiation tool up the wellbore towards the surface. Alternatively, the radiation can be produced and cementitious composition irradiated as the radiation tool is moved up the wellbore toward the surface. In still another alternative, the radiation tool can emit radiation continuously during displacement of the cementitious composition by the top plug through retrieval of the radiation tool through the pipe.

The cementitious composition can comprise hydraulic cement, a polymerizable additive, and sufficient water to form a slurry, wherein the polymerizable additive undergoes polymerization when subjected to the radiation.

Therefore, the embodiments described herein are well adapted to attain the ends and advantages mentioned as well as those that are inherent therein. The particular embodiments disclosed above are illustrative only, as the embodiments described herein may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the embodiments described herein. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method of cementing in a wellbore, comprising:
    introducing a cementitious composition into a pipe in the wellbore, wherein the cementitious composition sets when subjected to radiation;
    introducing a top plug connected to a radiation tool into the pipe above the cementitious composition, wherein movement of the top plug results in movement of the radiation tool;
    via the top plug, displacing the cementitious composition from the pipe and into an annulus formed between the pipe and the wellbore;
    producing radiation from the radiation tool; and
    irradiating the cementitious composition in the annulus by the radiation so that the cementitious composition sets.

2. The method of claim 1, wherein the cementitious composition is introduced into the pipe above a first fluid so that the cementitious composition displaces the first fluid from the pipe and into the annulus.

3. The method of claim 2, further comprising:
    introducing a bottom plug into the pipe above the first fluid and below the cementitious composition so that the cementitious composition forces the bottom plug downwardly in the pipe, thus displacing the first fluid from the pipe and into the annulus; and opening the bottom plug to allow passage of the cementitious composition into the annulus, wherein the downward movement of the top plug displaces the cementitious composition from the pipe and into the annulus.

4. The method of claim 3, further comprising:
introducing a second fluid above the top plug so that the top plug is moved downward, wherein the downward movement of the top plug displaces the cementitious composition from the pipe and into the annulus.

5. The method of claim 1, further comprising, after displacement of the cementitious composition from the pipe:
releasing the radiation tool from the top plug; and
moving the radiation tool up the wellbore to the surface.

6. The method of claim 1, wherein the top plug is connected to the radiation tool by a tether, and further comprising:
sending a first signal to the radiation tool through a wireline such that the radiation tool produces radiation; and
sending a second signal through the wireline to detach the radiation tool from the tether thus disconnecting the radiation tool from the top plug.

7. The method of claim 1, wherein ionizing radiation is produced from the radiation tool during displacement of the cementitious composition by the top plug thus irradiating a first portion of the cementitious composition in the annulus during displacement of a second portion of the cementitious composition from the pipe.

8. The method of claim 1, further comprising, after displacement of the cementitious composition from the pipe:
releasing the radiation tool from the top plug; and
moving the radiation tool up the wellbore to the surface wherein the radiation is produced and cementitious composition irradiated as the radiation tool is moved up the wellbore.

9. The method of claim 8, wherein the radiation tool emits radiation continuously during both the displacement of the cementitious composition by the top plug and a retrieval of the radiation tool through the pipe.

10. The method of claim 1, further comprising preparing a cementitious composition comprising hydraulic cement, a polymerizable additive, and sufficient water to form a slurry, wherein the polymerizable additive undergoes polymerization when subjected to the radiation.

11. The method of claim 10, further comprising, after displacement of the cementitious composition from the pipe:
releasing the radiation tool from the top plug; and
moving the radiation tool up the wellbore to the surface wherein the radiation is produced and cementitious composition irradiated as the radiation tool is moved up the wellbore.

12. The method of claim 1, wherein the top plug is connected to the radiation tool by a tether and further comprising:
sending a first signal to the radiation tool through a wireline such that the radiation tool produces radiation; and
sending a second signal through the wireline to detach the radiation tool from the tether thus disconnecting the radiation tool from the top plug.

13. The method of claim 12, further comprising moving the radiation tool upwards through the pipe by moving the wireline upward and irradiating the cementitious composition while the radiation tool moves upward.

14. The method of claim 13, wherein ionizing radiation is produced from the radiation tool during displacement of the cementitious composition by the top plug thus irradiating a first portion of the cementitious composition in the annulus during displacement of a second portion of the cementitious composition from the pipe.

15. The method of claim 14, further comprising preparing a cementitious composition comprising hydraulic cement, a polymerizable additive, and sufficient water to form a slurry, wherein the polymerizable additive undergoes polymerization when subjected to the radiation.

16. The method of claim 15, wherein the radiation tool emits radiation continuously during both the displacement of the cementitious composition by the top plug and a retrieval of the radiation tool through the pipe.

17. The method of claim 16, wherein the cementitious composition is introduced into the pipe above a first fluid so that the cementitious composition displaces the first fluid from the pipe and into the annulus, and wherein the method further comprises:
introducing a bottom plug into the pipe above the first fluid and below the cementitious composition so that the cementitious composition forces the bottom plug downwardly in the pipe, thus displacing the first fluid from the pipe and into the annulus;
introducing a second fluid above the top plug so that the top plug is moved downward; and
opening the bottom plug to allow passage of the cementitious composition into the annulus, wherein the downward movement of the top plug displaces the cementitious composition from the pipe and into the annulus.

\* \* \* \* \*